United States Patent
Nishimura

(10) Patent No.: US 10,224,815 B2
(45) Date of Patent: Mar. 5, 2019

(54) VOLTAGE CONVERTER HAVING A STEP-UP AND STEP-DOWN ADJUSTMENT CIRCUIT

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Tsuguo Nishimura, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 25 days.

(21) Appl. No.: 15/516,604

(22) PCT Filed: Sep. 29, 2015

(86) PCT No.: PCT/JP2015/077416
§ 371 (c)(1),
(2) Date: Apr. 3, 2017

(87) PCT Pub. No.: WO2016/059965
PCT Pub. Date: Apr. 21, 2016

(65) Prior Publication Data
US 2018/0234017 A1 Aug. 16, 2018

(30) Foreign Application Priority Data
Oct. 14, 2014 (JP) .................. 2014-210011

(51) Int. Cl.
*H02M 3/158* (2006.01)
*H02M 1/08* (2006.01)
*H02M 1/00* (2006.01)

(52) U.S. Cl.
CPC .......... *H02M 3/1582* (2013.01); *H02M 1/08* (2013.01); *H02M 2001/0009* (2013.01)

(58) Field of Classification Search
CPC .. H02M 3/158; H02M 3/1582; H02M 3/1588; G05F 1/24
See application file for complete search history.

(56) References Cited

U.S. PATENT DOCUMENTS 6,166,527 A * 12/2000 Dwelley ............. H02M 3/1582
  323/222
6,191,567 B1 * 2/2001 Sluijs ................. H02M 3/1582
  323/259

(Continued)

FOREIGN PATENT DOCUMENTS

JP   S62-18970 A   1/1987
JP   2006-006004 A   1/2006

(Continued)

OTHER PUBLICATIONS

Search Report for International Application No. PCT/JP2015/077416, dated Dec. 22, 2015, 4 pp.

*Primary Examiner* — Gary L Laxton
(74) *Attorney, Agent, or Firm* — Honigman LLP

(57) ABSTRACT

A voltage converter performs a step-up operation and step-down operation in parallel. The step-up operation raises an input voltage to a voltage that is N (N≥1) times the input voltage. The step-down operation lowers the input voltage to a voltage that is M (0≤M≤1) times the input voltage. The voltage converter outputs the voltage transformed through the step-up operation and the step-down operation from output terminals. A current detection circuit detects an output current. A step-up adjustment circuit decreases N if the output current is higher than a reference current, and increases N if the output current is lower than the reference current. A step-down adjustment circuit decreases M if the (Continued)

output current is higher than a reference current, and increases M if the output current is lower than the reference current. The reference current is higher than the reference current.

4 Claims, 9 Drawing Sheets

(56) References Cited

U.S. PATENT DOCUMENTS

| | | | | |
|---|---|---|---|---|
| 7,268,525 | B2* | 9/2007 | Ishii | H02M 3/1582 323/282 |
| 8,373,401 | B2* | 2/2013 | Kasaba | H02M 3/1582 307/10.8 |
| 8,981,737 | B2* | 3/2015 | Huang | H02M 3/1582 323/259 |
| 9,467,053 | B2* | 10/2016 | Fabbro | H02M 3/1582 |
| 2008/0007232 | A1 | 1/2008 | Nitta et al. | |

FOREIGN PATENT DOCUMENTS

| | | |
|---|---|---|
| JP | 2010-158116 A | 7/2010 |
| JP | 2010-284046 A | 12/2010 |
| JP | 2011-130557 A | 6/2011 |

* cited by examiner

VOLTAGE CONVERTER HAVING A STEP-UP AND STEP-DOWN ADJUSTMENT CIRCUIT

CROSS-REFERENCE TO RELATED APPLICATIONS

This application is the U.S. national stage of PCT/JP2015/077416 filed Sep. 29, 2015, which claims priority of Japanese Patent Application No. JP 2014-210011 filed Oct. 14, 2014.

TECHNICAL FIELD

The present invention relates to a voltage converter that performs a step-up operation for raising an input voltage that is externally input, and a step-down operation for lowering the input voltage.

BACKGROUND ART

Currently, vehicles are provided with multiple electrical devices (loads) that are powered by a battery. These loads include loads to which a voltage that is different from an output voltage of the battery is to be applied to power the load. In order to power such a load, the vehicle is provided with a voltage converter for transforming a voltage (see, for example, JP-S62-18970A).

The voltage converter disclosed in JP-S62-18970A performs a step-up operation for raising an input voltage that is externally input to a voltage that is N (N.gtoreq.1) times as high as the input voltage, and a step-down operation for lowering the input voltage to a voltage that is M (0.ltoreq.M.ltoreq.1) times as high as the input voltage. The voltage that has been transformed through the step-up operation or the step-down operation is output to the load.

During the step-up operation, if an output voltage that was output to the load is lower than a reference voltage, the output voltage is raised by increasing N, and if the output voltage is higher than the reference voltage, the output voltage is lowered by decreasing N. Also, during the step-down operation, if the output voltage that was output to the load is lower than the reference voltage, the output voltage is raised by increasing M, and if the output voltage is higher than the reference voltage, the output voltage is lowered by decreasing M.

With the above-described measures, it is possible to transform the input voltage into the reference voltage, and to apply the reference voltage to the load.

As a conventional voltage converter, there is a voltage converter that performs a step-up operation and a step-down operation in parallel, and adjusts an output voltage so that an output current to be output to a load is a predetermined current.

In this voltage converter, if the output current is lower than the predetermined current, the output voltage is raised by increasing N and M, and if the output current is higher than the predetermined current, the output voltage is lowered by decreasing N and M.

In voltage converters having the above-described configuration, N and M are simultaneously increased if an output current is lower than a predetermined current, and thus an output voltage may increase excessively and the output current may largely exceed the predetermined current. Furthermore, N and M are simultaneously decreased if the output current is higher than the predetermined current, and thus the output voltage may decrease excessively and the output current may largely fall below the predetermined current.

Accordingly, the above-described conventional voltage converter has the problem that an output current repeatedly increases and decreases alternately, and is not stable.

The present invention was made in view of the above-described circumstances, and an object thereof is to provide a voltage converter that can cause an output current to stably flow.

SUMMARY

According to the present invention, a voltage converter that performs, in parallel, a step-up operation for raising an input voltage that is applied to a pair of input terminals to a voltage that is N (N.gtoreq.1) times as high as the input voltage, and a step-down operation for lowering the input voltage to a voltage that is M (0.ltoreq.M.ltoreq.1) times as high as the input voltage, and that outputs the voltage that has been transformed through the step-up operation and the step-down operation from a pair of output terminals. The voltage converter includes: a current detection circuit configured to detect a current flowing between the pair of output terminals; a step-up adjustment circuit configured to decrease N if the detected current that was detected by the current detection circuit is higher than a current I1, and increase N if the detected current is lower than the current I1; and a step-down adjustment circuit configured to decrease M if the detected current is higher than a current I2 (>the current I1), and increase M if the detected current is lower than the current I2.

According to the present invention, a step-up operation for raising the input voltage that is input between the pair of input terminals, and a step-down operation for lowering the input voltage are performed. The step-up operation is an operation for raising the input voltage to a voltage that is N times as high as the input voltage in a state in which no step-down operation is performed. The step-down operation is an operation for lowering the input voltage to a voltage that is M times as high as the input voltage in a state in which no step-up operation is performed. By performing the step-up operation and the step-down operation in parallel, the input voltage is transformed, and the transformed voltage is output from the pair of output terminals. The current detection circuit detects a current flowing between the pair of output terminals.

The step-up adjustment circuit increases N if the detected current that was detected by the current detection circuit is lower than the current I1, and decreases N if the detected current is higher than the current I1. The step-down adjustment circuit increases M if the detected current is lower than the current I2, and decreases M if the detected current is higher than the current I2. Due to the increase in N or M, the current flowing between the pair of output terminals increases, and due to the decrease in N or M, the current flowing between the pair of output terminals decreases.

The current I2 is higher than the current I1. If the detected current is higher than the current I1 and lower than the current I2, N is decreased and M is increased. If N is a lower limit value, or M is an upper limit value, the output current is stable at a current between the current I1 and the current I2 inclusive. The lower limit value for N is set to a value that is equal to or greater than 1 because N.gtoreq.1 is satisfied, and the upper limit value for M is set to a value that is equal to or smaller than 1 because 0.ltoreq.M.ltoreq.1 is satisfied. If the output current is stable in a state in which N is the lower limit value and M is smaller than the upper limit value, the output current is adjusted to the current I2. If the output current is stable in a state in which N exceeds the lower limit value, and M is the upper limit value, the output current is adjusted to the current I1.

According to the present invention, a voltage converter that performs, in parallel, a step-up operation for raising an input voltage that is applied to a pair of input terminals to a voltage that is N (N.gtoreq.1) times as high as the input voltage, and a step-down operation for lowering the input voltage to a voltage that is M (0.ltoreq.M.ltoreq.1) times as high as the input voltage, and that outputs the voltage that has been transformed through the step-up operation and the step-down operation from a pair of output terminals. The voltage converter includes: output means for outputting a high voltage if a current flowing between the pair of output terminals is high, and outputting a low voltage if the current flowing between the pair of output terminals is low; a step-up adjustment circuit configured to decrease N if the voltage output by the output means is higher than a voltage V1, and increase N if the voltage output by the output means is lower than the voltage V1; and a step-down adjustment circuit configured to decrease M if the voltage output by the output means is higher than a voltage V2 (>the voltage V1), and increase M if the voltage output by the output means is lower than the voltage V2.

According to the present invention, a step-up operation for raising the input voltage that is input between the pair of input terminals, and a step-down operation for lowering the input voltage are performed. The step-up operation is an operation for raising the input voltage to a voltage that is N times as high as the input voltage in a state in which no step-down operation is performed. The step-down operation is an operation for lowering the input voltage to a voltage that is M times as high as the input voltage in a state in which no step-up operation is performed. By performing the step-up operation and the step-down operation in parallel, the input voltage is transformed, and the transformed voltage is output from the pair of output terminals. The output means outputs a high voltage if the current flowing between the pair of output terminals is high, and outputs a low voltage if the current flowing between the pair of output terminals is low.

The step-up adjustment circuit increases N if the voltage output by the output means is lower than the voltage V1, and decreases N if the voltage output by the output means is higher than the voltage V1. The step-down adjustment circuit increases M if the voltage output by the output means is lower than the voltage V2, and decreases M if the voltage output by the output means is higher than the voltage V2. Due to the increase in N or M, the current flowing between the pair of output terminals increases, and due to the decreases in N or M, the current flowing between the pair of output terminals decreases.

The voltage V2 is higher than the voltage V1. If the voltage that was output by the output means is higher than the voltage V1 and lower than the voltage V2, N is decreased and M is increased. If N is a lower limit value, or M is an upper limit value, the voltage output by the output means is stable at a voltage between the voltage V1 and the voltage V2 inclusive, and the output current is also stable. The lower limit value for N is set to a value that is equal to or greater than 1 because N.gtoreq.1 is satisfied, and the upper limit value for M is set to a value that is equal to or smaller than 1 because 0.ltoreq.M.ltoreq.1 is satisfied. If the output current is stable in a state in which N is the lower limit value and M is smaller than the upper limit value, the voltage output by the output means is adjusted to the voltage V2. If the output current is stable in a state in which N exceeds the lower limit value and M is the upper limit value, the voltage output by the output means is adjusted to the voltage V1.

The voltage converter according to the present invention may further include a generation circuit configured to generate the voltages V1 and V2; and adjusting means for adjusting the voltage V1 or V2 that is generated by the generation circuit.

According to the present invention, the generation circuit generates the voltages V1 and V2. If, for example, an output current that is stably flowing from the pair of output terminals is different from the current that should flow between the pair of output terminals, the output current that is stably flowing from the pair of output terminals is adjusted by adjusting the voltage V1 or V2.

The voltage converter according to the present invention may be such that the generation circuit is configured to generate the voltage V1 by dividing the voltage V2.

According to the present invention, the generation circuit generates the voltage V1 by dividing the voltage V2. Therefore, when the voltage V2 is adjusted, the voltage V1 is also automatically adjusted.

According to the present invention, it is possible to cause an output current to stably flow.

DETAILED DESCRIPTION OF THE EMBODIMENTS

Hereinafter, the present invention will be described in detail with reference to the drawings showing an embodiment thereof.

Figure 1:
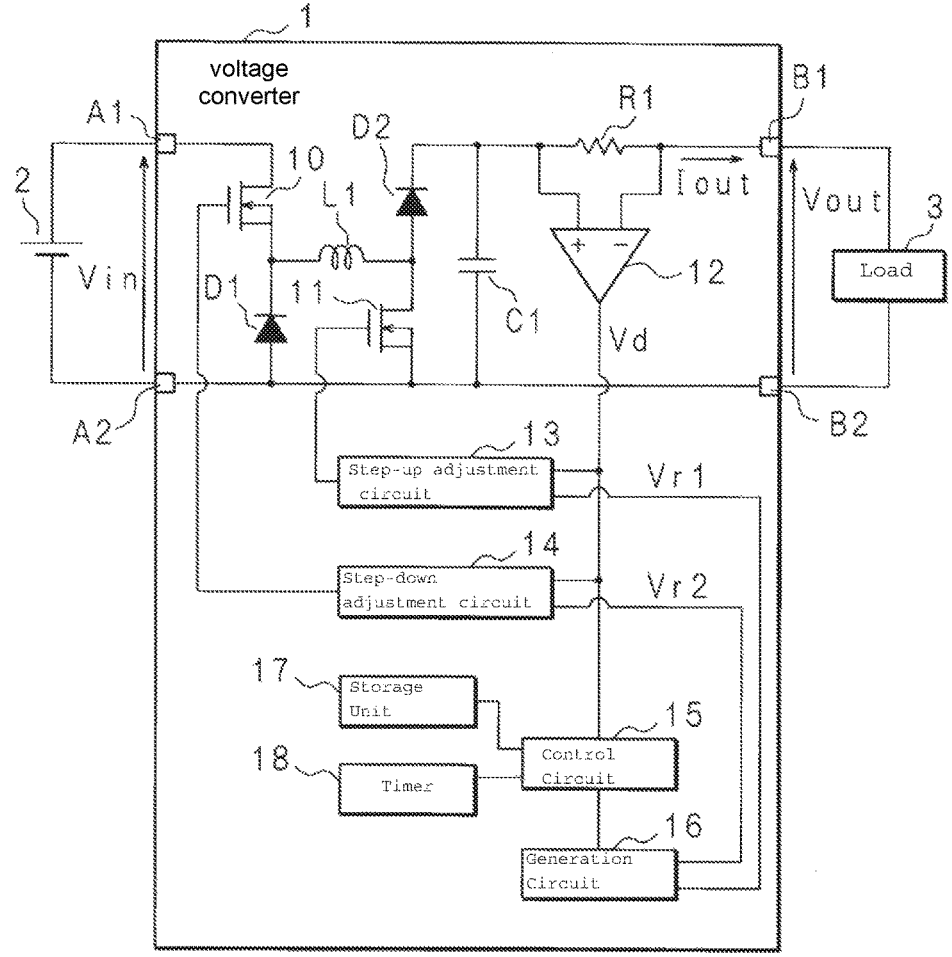
FIG. 1 is a circuit diagram of a voltage converter according to the present embodiment.

FIG. 1 is a circuit diagram of a voltage converter 1 according to the present embodiment. The voltage converter 1 is appropriately installed in a vehicle. The voltage converter 1 is provided with two input terminals A1 and A2, which serve as a pair of input terminals, and two output terminals B1 and B2, which serve as a pair of output terminals. The input terminal A1 is connected to the positive electrode of a battery 2, and the input terminal A2 is connected to the negative electrode of the battery 2. The output terminal B1 is connected to one end of a load 3, and the output terminal B2 is connected to the other end of the load 3.

The voltage converter 1 transforms an input voltage Vin that is applied between the input terminals A1 and A2 by the battery 2, and outputs the transformed voltage serving as an output voltage Vout from the output terminals B1 and B2. The output voltage Vout is applied between both ends of the load 3, and the load 3 is powered therewith. The load 3 is an electrical device that is installed in the vehicle.

The voltage converter 1 is provided with, in addition to the input terminals A1 and A2 and the output terminals B1 and B2, N channel-type FETs (Field Effect Transistors) 10 and 11, a differential amplifier 12, a step-up adjustment circuit 13, a step-down adjustment circuit 14, a control unit 15, a generation circuit 16, a storage unit 17, a timer 18, a capacitor C1, diodes D1 and D2, a coil L1, and a resistor R1.

The input terminal A1 is connected to the drain of the FET 10, and the source of the FET 10 is connected to the cathode of the diode D1 and one end of the coil L1. The other end of the coil L1 is connected to the anode of the diode D2 and the drain of the FET 11. The cathode of the diode D2 is connected to the positive terminal of the differential amplifier 12, one end of the capacitor C1, and one end of the resistor R1. The other end of the resistor R1 is connected to the negative terminal of the differential amplifier 12 and the output terminal B1. The input terminal A2 is connected to the source of the FET 11, the output terminal B2, the other end of the capacitor C1, and the anode of the diode D1.

The output terminal of the differential amplifier 12 is connected to the step-up adjustment circuit 13, the step-down adjustment circuit 14, and the control unit 15. The step-up adjustment circuit 13 is further connected to the gate of the FET 11. The step-down adjustment circuit 14 is further connected to the gate of the FET 10. The control unit 15 is connected to, in addition to the output terminal of the differential amplifier 12, the generation circuit 16, the storage unit 17, and the timer 18. The generation circuit 16 is connected to, in addition to the control unit 15, the step-up adjustment circuit 13 and the step-down adjustment circuit 14.

The FETs 10 and 11 function as switches. If the voltage that is applied to the gate of the FET 10 is a predetermined voltage or higher, taking the electrical potential at the source thereof as a reference, a current can flow between the drain and the source of the FET 10, and the FET 10 is turned on. If the voltage that is applied to the gate of the FET 10 is lower than the predetermined voltage, taking the electrical potential at the source thereof as a reference, no current flows between the drain and the source of the FET 10, and the FET 10 is turned off. The FET 11 is also turned on and off like the FET 10.

In the voltage converter 1, a step-up operation for raising the input voltage Vin is performed by periodically turning the FET 11 on and off in a state in which the FET 10 is in an ON state or in which the FET 10 is repeatedly turned on and off. Turning the FET 11 on and off is periodically repeated by switching the FET 11 to the ON state from the OFF state or to the OFF state from the ON state in a predetermined cycle. The ratio of the ON period to one cycle is referred to as "duty ratio", which is represented by a value between 0 and 1 inclusive.

When the FET 11 is switched to the ON state from the OFF state, a large amount of current flows from the positive electrode of the battery 2 to the FET 10, the coil L1, and the FET 11 in this order. At this time, no voltage is applied between both ends of the capacitor C1. When the FET 11 is switched to the OFF state from the ON state, the current flows from one end, on the FET 11 side, of the coil L1 toward the diode D2.

At this time, the current flowing through the coil L1 gradually decreases, and the coil L1 outputs a voltage that is higher than the voltage that is applied to one end, on the FET 10 side, of the coil L1, taking the electrical potential at the input terminal A2 and the output terminal B2 as a reference, from the other end on the FET 11 side of the coil L1 toward the diode D2. Accordingly, if the FET 10 is in the ON state, the coil L1 applies a voltage that is higher than the input voltage Vin between both ends of the capacitor C1 via the diode D2.

The capacitor C1 smoothes the voltage that is applied between both ends thereof, and outputs the smoothed voltage from the output terminals B1 and B2 via the resistor R1. As described above, by periodically turning the FET 11 on and off when the FET 10 is maintained in the ON state, the output voltage Vout becomes a voltage that is N (N.gtoreq.1) times as high as the input voltage Vin. The larger the duty ratio of ON/OFF of the FET 11 is, that is, the longer a time period in which the FET 11 is in the ON state during one cycle is, the larger N is. Furthermore, the smaller the duty ratio of ON/OFF of the FET 11 is, that is, the shorter the time period in which the FET 11 is in the ON state during one cycle is, the smaller N is. N is 1 if the duty ratio of ON/OFF of the FET 11 is zero.

As described above, in the voltage converter 1, a step-up operation for raising the input voltage Vin to a voltage that is N times as high as the input voltage Vin is performed by periodically turning the FET 11 on and off.

In the voltage converter 1, a step-down operation for lowering the input voltage Vin is performed by periodically turning the FET 10 on and off in a state in which the FET 11 is in the OFF state, or in which the FET 11 is repeatedly turned on and off. The FET 10 is periodically turned on and off by switching the FET 10 to the ON state from the OFF state or to the OFF state from the ON state in a predetermined cycle.

When the FET 10 is switched to the ON state from the OFF state, the current flows from the positive electrode of the battery 2 to the FET 10 and the coil L1 in this order, and the current flowing through the coil L1 gradually increases. Therefore, the coil L1 outputs a first voltage from one end, on the FET 11 side, of the coil L1, the first voltage being lower than the input voltage Vin that is applied to the other end, on the FET 10 side, of the coil L1, taking the electrical potential at the input terminal A2 and the output terminal B2 as a reference. The first voltage is applied between both ends of the capacitor C1 via the diode D2 when the FET 11 is in the OFF state.

When the FET 10 is switched to the OFF state from the ON state, the current flows through the diode D1 and the coil L1 in this order, and the current flowing through the coil L1 gradually decreases. Accordingly, the coil L1 outputs a second voltage from one end, on the FET 11 side, of the coil L1, the second voltage being higher than the voltage that is applied to the other end, on the FET 10 side, of the coil L1, taking the electrical potential at the input terminal A2 and the output terminal B2 as a reference. The second voltage is applied between both ends of the capacitor C1 via the diode D2 when the FET 11 is in the OFF state. The second voltage is lower than the first voltage.

As described above, the capacitor C1 smoothes a voltage that is applied between both ends thereof, and outputs the smoothed voltage from the output terminals B1 and B2 via the resistor R1. As described above, by periodically turning the FET 10 on and off when the FET 11 is maintained in the OFF state, the output voltage Vout becomes a voltage that is M (0.ltoreq.M.ltoreq.1) times as high as the input voltage Vin. This is because both of the first voltage and the second voltage are equal to or lower than the input voltage Vin.

Since the first voltage is higher than the second voltage, the larger the duty ratio of ON/OFF of the FET 10 is, that is, the longer a time period in which the FET 10 is in the ON state during one cycle is, the larger M is. M is 1 if the duty ratio is 1. Similarly, since the first voltage is higher than the second voltage, the smaller the duty ratio of ON/OFF of the FET 10 is, that is, the shorter the time period in which the FET 10 is in the ON state during one cycle is, the smaller M is. M is zero if the duty ratio is zero.

As described above, in the voltage converter 1, a step-down operation for lowering the input voltage Vin to a voltage that is M times as high as the input voltage Vin is performed by periodically turning the FET 10 on and off.

In the voltage converter 1, the step-up operation and the step-down operation are performed in parallel, and a voltage that is transformed by the step-up operation and the step-down operation, that is, the output voltage Vout is output from the output terminals B1 and B2.

The voltage smoothed by the capacitor C1 is output from the output terminals B1 and B2 via the resistor R1. Accordingly, an output current Iout that flows from the output terminal B1 to the output terminal B2 via the load 3 also flows through the resistor R1.

The differential amplifier 12 amplifies the voltage obtained by subtracting the voltage that is input to the negative terminal thereof from the voltage that is input to the positive terminal thereof, that is, the voltage between both ends of the resistor R1, and outputs the amplified voltage Vd from the output terminal thereof to the step-up adjustment circuit 13, the step-down adjustment circuit 14, and the control unit 15.

The voltage Vd can be expressed as "K.times.r1.times.Iout", where "r1" refers to the resistance value of the resistor R1, and "K" refers to the amplification ratio of the differential amplifier 12. The amplification ratio K and the resistance value r1 are both constants. Accordingly, the voltage Vd is proportional to the output current Iout.

Accordingly, the differential amplifier 12 and the resistor R1 function as a current detection circuit for detecting a current flowing between the output terminals B1 and B2, and further function as output means for outputting a high voltage if the output current Iout is large, and outputting a lower voltage if the output current Iout is small.

The step-up adjustment circuit 13 and the step-down adjustment circuit 14 respectively output, to the gates of the FETs 11 and 10, a step-up PWM (Pulse Width Modulation) signal and a step-down PWM signal that are constituted by a high-level voltage and a low-level voltage. If a high-level voltage is applied to the gate of the FET 11, the voltage of the gate of the FET 11 becomes a predetermined voltage or more, taking the electrical potential at the source thereof as a reference, and the FET 11 is turned on. If a low-level voltage is applied to the gate of the FET 11, the voltage of the gate of the FET 11 becomes lower than the predetermined voltage, taking the electrical potential at the source thereof as a reference, and the FET 11 is turned off. Similar to the FET 11, the FET 10 is also turned on if a high-level voltage is applied to the gate thereof, and is turned off if a low-level voltage is applied to the gate thereof.

In the step-up PWM signal and the step-down PWM signal, a low-level voltage is switched to a high-level voltage, or a high-level voltage is switched to a low-level voltage, in a predetermined cycle. Therefore, the FETs 10 and 11 are periodically turned on and off. In the step-up PWM signal and the step-down PWM signal, the ratio of the time period in which a high-level voltage is output to one cycle is referred to as "duty ratio", which is represented by a value between 0 and 1 inclusive.

The voltage Vd from the output terminal of the differential amplifier 12 and a reference voltage Vr1 from the generation circuit 16 are input to the step-up adjustment circuit 13. The step-up adjustment circuit 13 adjusts, based on the input voltage Vd and reference voltage Vr1, the duty ratio of the step-up PWM signal output to the gate of the FET 11, and thereby adjusts N.

The voltage Vd from the output terminal of the differential amplifier 12 and a reference voltage Vr2, which is higher than the reference voltage Vr1, from the generation circuit 16 are input to the step-down adjustment circuit 14. The step-down adjustment circuit 14 adjusts, based on the input voltage Vd and reference voltage Vr2, the duty ratio of the step-down PWM signal output to the gate of the FET 10, and thereby adjusts M.

The control unit 15 outputs an adjustment PWM signal for adjusting the reference voltages Vr1 and Vr2 to the generation circuit 16. Similar to the step-up PWM signal or the step-down PWM signal, the adjustment PWM signal is constituted by a high-level voltage and a low-level voltage. Also in the adjustment PWM signal, a low-level voltage is switched to a high-level voltage, or a high-level voltage is switched to a low-level voltage, in a predetermined cycle. "Duty ratio" is defined as with the step-up PWM signal or the step-down PWM signal.

The generation circuit 16 generates the reference voltages Vr1 and Vr2, and outputs the generated reference voltage Vr1 to the step-up adjustment circuit 13, and the generated reference voltage Vr2 to the step-down adjustment circuit 14. The reference voltages Vr1 and Vr2 generated by the generation circuit 16 are adjusted based on a duty ratio Da of the adjustment PWM signal that was output from the control unit 15.

The storage unit 17 is a nonvolatile memory. A set time that has been set in advance is stored in the storage unit 17. Furthermore, voltage information indicating the voltage Vd is stored over time in the storage unit 17 by the control unit 15.

A start instruction to instruct the start of time measurement, and an end instruction to instruct the end of the time measurement are input to the timer 18 from the control unit 15. The timer 18 starts time measurement upon input of the start instruction from the control unit 15. A measured time that was measured by the timer 18 is read by the control unit 15. The timer 18 ends the time measurement upon input of the end instruction from the control unit 15.

The control unit 15 is constituted by an arithmetic processing unit such as a CPU (Central Processing Unit) or an MPU (Micro Processing Unit). Control programs are stored in the storage unit 17. The control unit 15 executes various types of processing by reading the control programs from the storage unit 17, and executing the read control programs.

The control unit 15 controls the storage unit 17 to repeatedly store information indicating the voltage Vd that has been output from the output terminal of the differential amplifier 12 until the measured time measured by the timer 18 is the set time or more. Then, the control unit 15 determines whether or not the voltage Vd output from the output terminal of the differential amplifier 12 is stable, based on the voltage Vd indicated by a plurality of pieces of voltage information that have been stored in the storage unit 17 until the measured time is the set time or more. If it is determined that the voltage Vd is stable, the control unit 15 adjusts, based on the stable voltage Vd, the duty ratio Da of the adjustment PWM signal that is output to the generation circuit 16.

Figure 2:
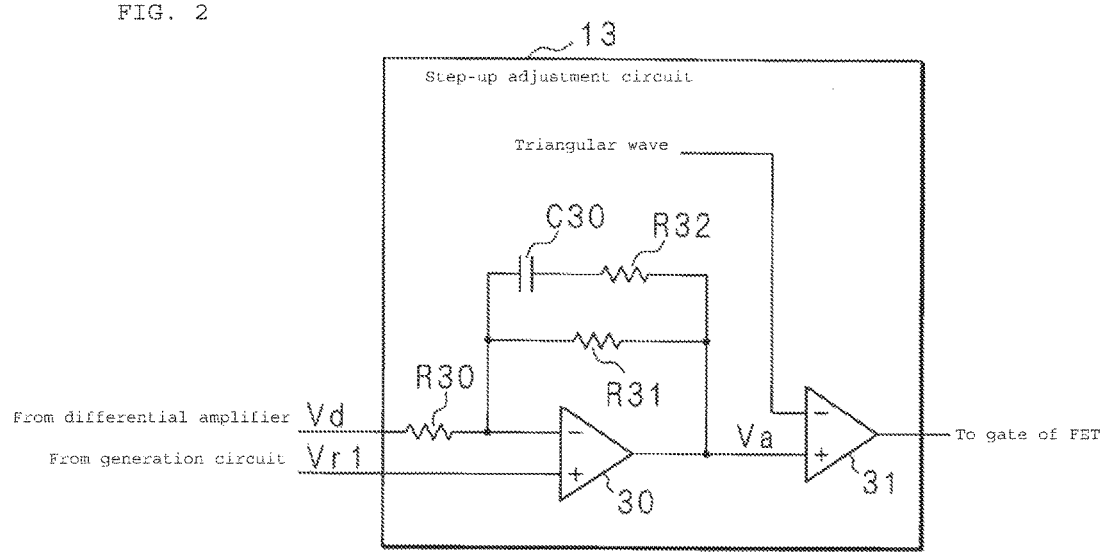
FIG. 2 is a circuit diagram of a step-up adjustment circuit.

FIG. 2 is a circuit diagram of the step-up adjustment circuit 13. The step-up adjustment circuit 13 includes a differential amplifier 30, a comparator 31, resistors R30, R31, and R32, and a capacitor C30. The positive terminal of the differential amplifier 30 is connected to the generation circuit 16. One end of the resistor R30 is connected to the output terminal of the differential amplifier 12. The other end of the resistor R30 is connected to the negative terminal of the differential amplifier 30, one end of the capacitor C30, and one end of the resistor R31.

The other end of the capacitor C30 is connected to one end of the resistor R32, and the other end of resistor R31 and the other end of the resistor R32 are connected to the output terminal of the differential amplifier 30. The output terminal of the differential amplifier 30 is further connected to the positive terminal of the comparator 31, and the output terminal of the comparator 31 is connected to the gate of the FET 11. A triangular wave W1 is input to the negative terminal of the comparator 31.

The differential amplifier 30, the resistors R30, R31, and R32, and the capacitor C30 function as an error amplifier, and output a voltage Va based on the voltage Vd and the reference voltage Vr1 from the output terminal to the positive terminal of the comparator 31. The voltage Va increases if the voltage Vd is lower than the reference voltage Vr1, and the voltage Va decreases if the voltage Vd is higher than the reference voltage Vr1. If the voltage Va is equal to or higher than the voltage of the triangular wave W1 that is applied to the negative terminal of the comparator 31, the comparator 31 outputs a high-level voltage from the output terminal thereof to the gate of the FET 11. If the voltage Va is lower than the voltage of the triangular wave that is applied to the negative terminal of the comparator 31, the comparator 31 outputs a low-level voltage from the output terminal thereof to the gate of the FET 11.

Figure 3:
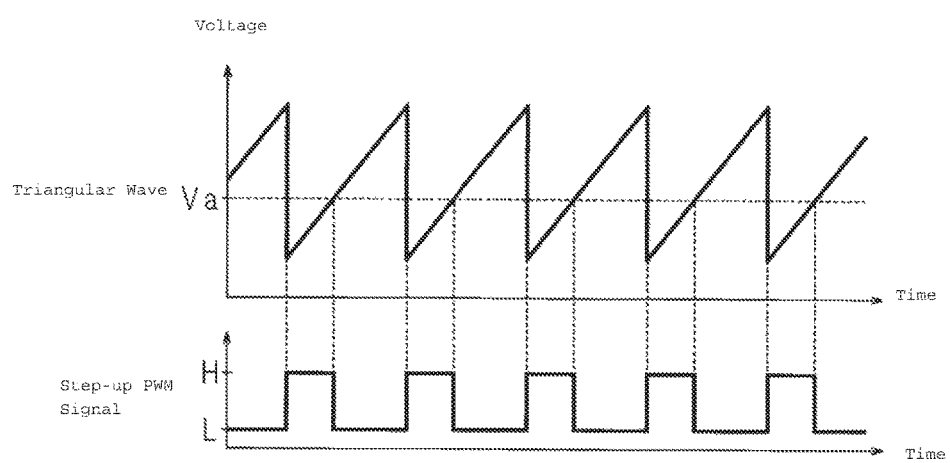
FIG. 3 is a diagram illustrating an operation of the step-up adjustment circuit.

FIG. 3 is a diagram illustrating an operation of the step-up adjustment circuit 13. FIG. 3 shows a wave shape of the triangular wave W1 that is output to the negative terminal of the comparator 31, and a wave shape of the step-up PWM signal that is output from the output terminal of the comparator 31. In FIG. 3, "H" denotes a high-level voltage, and "L" denotes a low-level voltage.

As shown in FIG. 3, the triangular wave W1 has a wave shape in which a gentle increase in the voltage and a drastic decrease in the voltage are periodically repeated. The triangular wave W1 is a so-called saw-tooth wave. The comparator 31 outputs a high-level voltage over a time period in which the voltage Va is equal to or higher than the voltage of the triangular wave W1, and outputs a low-level voltage over a time period in which the voltage Va is lower than the voltage of the triangular wave W1. In this way, the comparator 31 outputs a step-up PWM signal to the gate of the FET 11.

If the voltage Vd is lower than the reference voltage Vr1, the voltage Va increases, and the duty ratio of the step-up PWM signal increases. The increase in the duty ratio of the step-up PWM signal increases the duty ratio of ON/OFF of the FET 11, and increases N. With this, the output voltage Vout increases, and the output current Iout increases. Accordingly, the step-up adjustment circuit 13 increases N if the voltage Vd is lower than the reference voltage Vr1.

If the voltage Vd is higher than the reference voltage Vr1, the voltage Va decreases, and the duty ratio of the step-up PWM signal decreases. The decrease in the duty ratio of the step-up PWM signal decreases the duty ratio of ON/OFF of the FET 11, and decreases N. With this, the output voltage Vout decreases, and the output current Iout decreases. Accordingly, the step-up adjustment circuit 13 decreases N if the voltage Vd is higher than the reference voltage Vr1. The reference voltage Vr1 corresponds to the "voltage V1" recited in the claims.

As described above, the voltage Vd can be expressed as "K.times.r1.times.Iout". Since the amplification ratio K and the resistance value r1 are both constants, comparing the voltage Vd with the reference voltage Vr1 is equivalent to comparing the output current Iout that was detected by the current detection circuit constituted by the resistor R1 and the differential amplifier 12 with a reference current Ir1 (=Vr1/(K.times.r1)). If the voltage Vd is higher than the reference voltage Vr1, this means that the detected output current Iout is higher than the reference current Ir1, and if the voltage Vd is lower than the reference voltage Vr1, this means that the detected output current Iout is lower than the reference current Ir1.

Accordingly, the step-up adjustment circuit 13 serves also as a circuit that decreases N if the output current Iout that was detected by the current detection circuit constituted by the resistor R1 and the differential amplifier 12 is higher than the reference current Ir1, and increases N if the output current Iout is lower than the reference current Ir1. The step-up adjustment circuit 13 adjusts the duty ratio of the step-up PWM signal so that the output current Iout is equal to the reference current Ir1. The reference current Ir1 corresponds to the "current I1" recited in the claims.

A lower limit voltage is set for the voltage Va. The duty ratio of the step-up PWM signal that is output from the comparator 31 when the voltage Va is a lower limit voltage is the lower limit value of the duty ratio of the step-up PWM signal. The lower limit value of the duty ratio of the step-up PWM signal is zero when the lower limit voltage is lower than a lowermost voltage of the triangular wave W1. Furthermore, N has a lower limit value that is obtained by dividing the output voltage Vout by the input voltage Vin when the duty ratio of the step-up PWM signal has a lower limit value in a state in which no step-down operation is performed, that is, the FET 10 is maintained in the ON state. The lower limit value of N is a value that is equal to or greater than 1.

Figure 4:
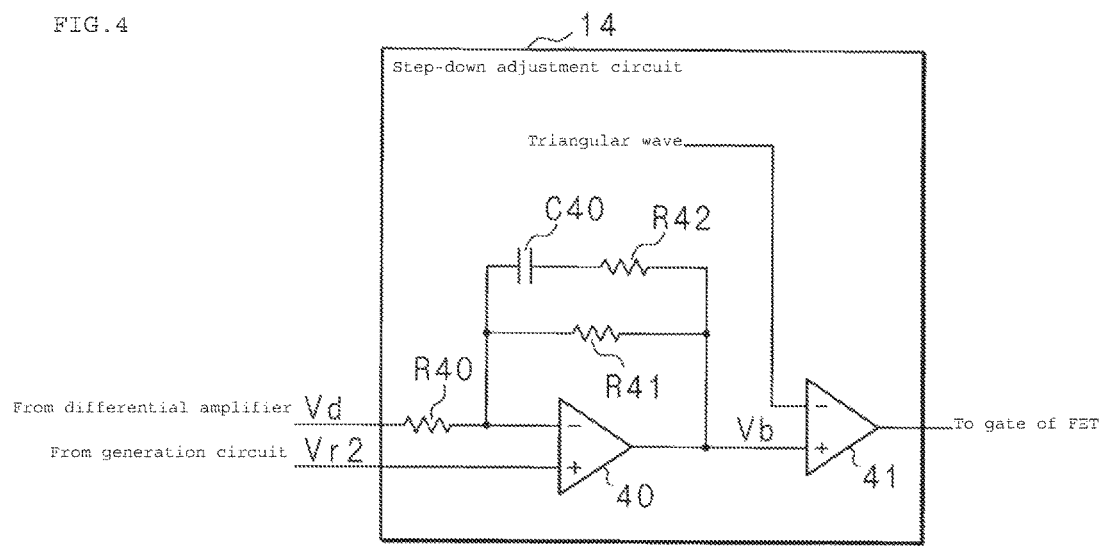
FIG. 4 is a circuit diagram of a step-down adjustment circuit.

FIG. 4 is a circuit diagram of the step-down adjustment circuit 14. The step-down adjustment circuit 14 includes a differential amplifier 40, a comparator 41, resistors R40, R41, and R42, and a capacitor C40. These components are connected to each other like the differential amplifier 30, the comparator 31, the resistors R30, R31, and R32, and the capacitor C30 of the step-up adjustment circuit 13. Here, the differential amplifier 30, the comparator 31, the resistors R30, 31, 32, and the capacitor C30 respectively correspond to the differential amplifier 40, the comparator 41, the resistors R40, R41, and R42, and the capacitor C40.

The positive terminal of the differential amplifier 40 is connected to the generation circuit 16. One end of the resistor R40 that is different from the end on the differential amplifier 40 side is connected to the output terminal of the differential amplifier 12. A triangular wave W2 is input to the negative terminal of the comparator 41. The output terminal of the comparator 41 is connected to the gate of the FET 10.

The differential amplifier 40, the resistors R40, R41, and R42, and the capacitor C40 function as an error amplifier, and operates like the error amplifier that is constituted by the differential amplifier 30, the resistors R30, R31, and R32, and the capacitor C30. Accordingly, a voltage Vb increases if the voltage Vd is lower than the reference voltage Vr2 (>Vr1), and the voltage Vb decreases if the voltage Vd is higher than the reference voltage Vr2.

The comparator 41 of the step-down adjustment circuit 14 operates like the comparator 31 of the step-up adjustment circuit 13, and outputs a step-down PWM signal from the output terminal thereof to the gate of the FET 11. Furthermore, the wave shape of the triangular wave W1 is similar to the wave shape of the triangular wave W2. That is, the triangular wave W2 is a so-called saw-tooth wave, which has a wave shape in which a gentle increase in voltage and a drastic decrease in voltage are periodically repeated.

Accordingly, if the voltage Vd is lower than the reference voltage Vr2, the voltage Vb increases, and the duty ratio of the step-down PWM signal increases. The increase in the duty ratio of the step-down PWM signal increases the duty ratio of ON/OFF of the FET 10, and increases M. With this, the output voltage Vout increases, and the output current Iout increases. Accordingly, the step-down adjustment circuit 14 increases M if the voltage Vd is lower than the reference voltage Vr2.

If the voltage Vd is higher than the reference voltage Vr2, the voltage Vb decreases, and the duty ratio of the step-down PWM signal decreases. The decrease in the duty ratio of the step-down PWM signal decreases the duty ratio of ON/OFF of the FET 10, and decreases M. With this, the output voltage Vout decreases, and the output current Iout decreases. Accordingly, the step-down adjustment circuit 14 decreases M if the voltage Vd is higher than the reference voltage Vr2. The reference voltage Vr2 corresponds to the "voltage V2" recited in the claims.

As described above, the voltage Vd can be expressed as "K.times.r1.times.Iout". Since the amplification ratio K and the resistance value r1 are both constants, comparing the voltage Vd with the reference voltage Vr2 is equivalent to comparing the output current Iout that was detected by the current detection circuit constituted by the resistor R1 and the differential amplifier 12 with a reference current Ir2 (=Vr2/(K.times.r1)). If the voltage Vd is higher than the reference voltage Vr2, this means that the detected output current Iout is higher than the reference current Ir2, and if the voltage Vd is lower than the reference voltage Vr2, this means that the detected output current Iout is lower than the reference current Ir2.

Accordingly, the step-down adjustment circuit 14 serves also as a circuit that decreases M if the output current Iout that was detected by the current detection circuit constituted by the resistor R1 and the differential amplifier 12 is higher than the reference current Ir2, and increases M if the output current Iout is lower than the reference current Ir2. Since the reference voltage Vr2 is higher than the reference voltage Vr1, the reference current Ir2 is higher than the reference current Ir1. The step-down adjustment circuit 14 adjusts the duty ratio of the step-down PWM signal so that the output current Iout is equal to the reference current Ir2.

The reference current Ir2 corresponds to the "current I2" recited in the claims.

An upper limit voltage is set for the voltage Vb. The duty ratio of the step-down PWM signal that is output from the comparator 41 when the voltage Vb is an upper limit voltage is the upper limit value of the duty ratio of the step-down PWM signal. The upper limit value of the duty ratio of the step-down PWM signal is 1 when the upper limit voltage exceeds an uppermost voltage of the triangular wave W2. Furthermore, M has an upper limit value that is obtained by dividing the output voltage Vout by the input voltage Vin when the duty ratio of the step-down PWM signal has an upper limit value in a state in which no step-up operation is performed, that is, the FET 11 is maintained in the OFF state. The upper limit value of M is a value that is equal to or smaller than 1.

Figure 5:
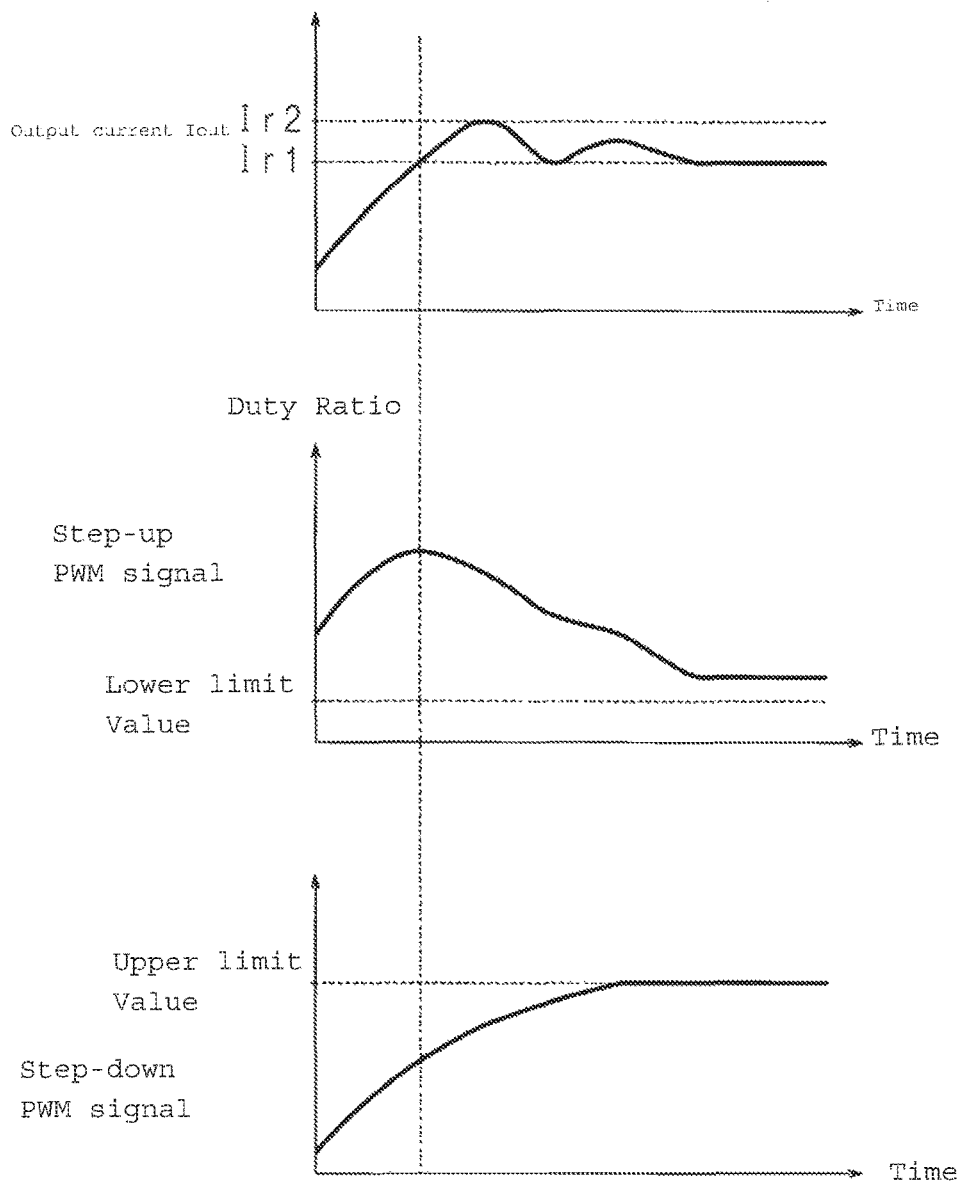
FIG. 5 is a diagram illustrating an operation of the voltage converter.

FIG. 5 is a diagram illustrating an operation of the voltage converter 1. FIG. 5 shows a curve of the output current Iout, and curves of duty ratios of the step-up PWM signal and the step-down PWM signal. These curves are curves over a time period in which the reference voltages Vr1 and Vr2, that is, the reference currents Ir1 and Ir2 are maintained at predetermined values. An example in which the output current Iout converges to the reference current Ir1 will be described with reference to FIG. 5.

When the output current Iout is lower than the reference current Ir1 (<Ir2), the step-up adjustment circuit 13 and the step-down adjustment circuit 14 respectively increase the duty ratio of the step-up PWM signal, and the duty ratio of the step-down PWM signal. Accordingly, the output current Iout increases. When the output current Iout is between the reference current Ir1 and the reference current Ir2 inclusive, the step-up adjustment circuit 13 decreases the duty ratio of the step-up PWM signal in order that the output current Iout is equal to the reference current Ir1. In the same case, the step-down adjustment circuit 14 increases the duty ratio of the step-down PWM signal in order that the output current Iout is equal to the reference current Ir2.

When the output current Iout is close to the reference current Ir1, the effect of the step-down adjustment circuit 14 that is about to increase the output current Iout is larger than the effect of the step-up adjustment circuit 13 that is about to decrease the output current Iout, and thus the output current Iout increases toward the reference current Ir2.

When the output current Iout is close to the reference current Ir2, the effect of the step-up adjustment circuit 13 that is about to decrease the output current Iout is larger than the effect of the step-down adjustment circuit 14 that is about to increase the output current Iout, the output current Iout decreases toward the reference current Ir1.

While the output current Iout is between the reference current Ir1 and the reference current Ir2 inclusive, the output current come close to the reference currents Ir1 and Ir2 alternately, the duty ratio of the step-up PWM signal continues to decrease, and the duty ratio of the step-down PWM signal continues to increase.

When the duty ratio of the step-down PWM signal reaches an upper limit value in a state in which the duty ratio of the step-up PWM signal exceeds a lower limit value, that is, when M reaches the upper limit value in the state in which N exceeds the lower limit value, the duty ratio of the step-down PWM signal is maintained at the upper limit value. Then, due to adjustment of the duty ratio of the step-up PWM signal that is performed by the step-up adjustment circuit 13, the output current Iout is adjusted to the reference current Ir1, and the output current Iout is stabilized.

Figure 6:
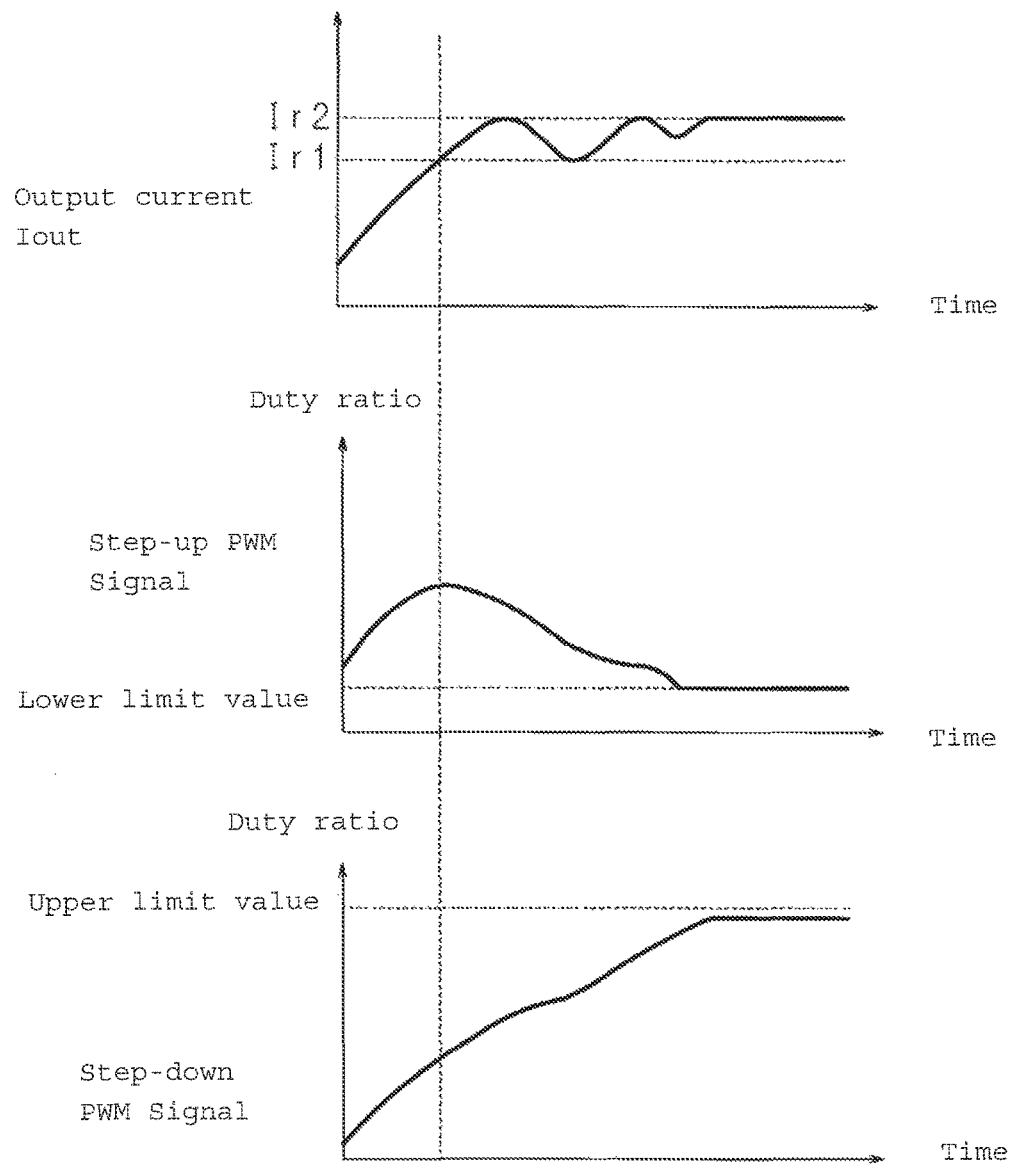
FIG. 6 is another diagram illustrating an operation of the voltage converter.

FIG. 6 is another diagram illustrating an operation of the voltage converter 1. Similar to FIG. 5, FIG. 6 also shows a curve of the output current Iout, and curves of duty ratios of the step-up PWM signal and the step-down PWM signal. These curves as well are curves over a time period in which the reference voltages Vr1 and Vr2, that is, the reference currents Ir1 and Ir2 are maintained at predetermined values. An example in which the output current Iout converges to the reference current Ir2 will be described with reference to FIG. 6.

As described above, when the output current Iout is lower than the reference current Ir1, the duty ratios of the step-up PWM signal and the step-down PWM signal increase, and the output current Iout increases. Furthermore, as described above, when the output current Iout is between the reference current Ir1 and the reference current Ir2 inclusive, the duty ratio of the step-up PWM signal continues to decrease, and the duty ratio of the step-down PWM signal continues to increase. During this period, the output current Iout comes close to the reference currents Ir1 and Ir2 alternately.

When the duty ratio of the step-up PWM signal reaches the lower limit value in a state in which the duty ratio of the step-down PWM signal is lower than the upper limit value, that is, when N reaches the lower limit value in a state in which M is lower than the upper limit value, the duty ratio of the step-up PWM signal is maintained at the lower limit value. Then, due to adjustment of the duty ratio of the step-down PWM signal that is performed by the step-down adjustment circuit 14, the output current Iout is adjusted to the reference current Ir2, and the output current Iout is stabilized.

Figure 7:
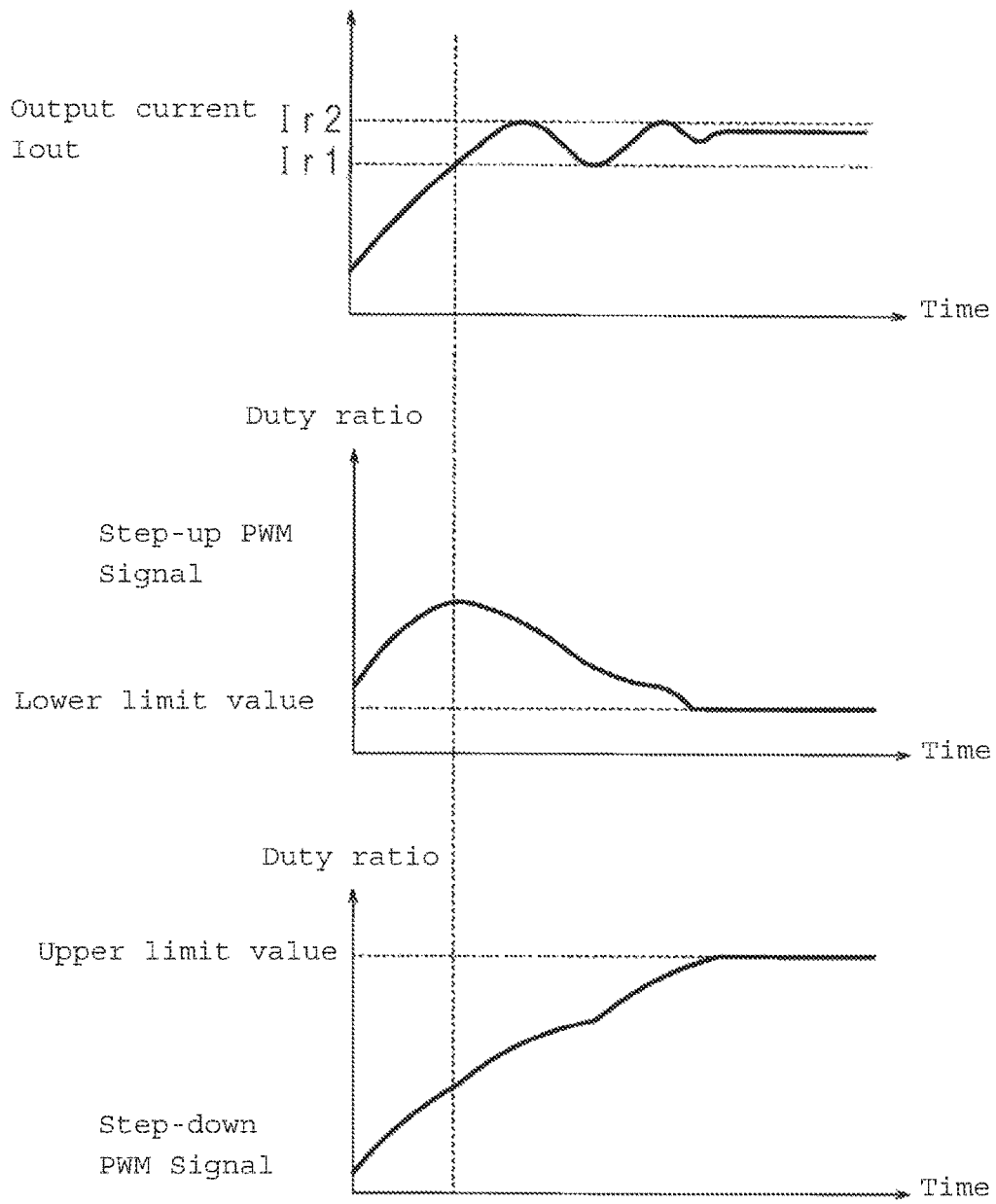
FIG. 7 is yet another diagram illustrating an operation of the voltage converter.

FIG. 7 is yet another diagram illustrating an operation of the voltage converter 1. Similar to FIG. 5 or 6, FIG. 7 also shows a curve of the output current Iout, and curves of duty ratios of the step-up PWM signal and the step-down PWM signal. These curves as well are curves over a time period in which the reference voltages Vr1 and Vr2, that is, the reference currents Ir1 and Ir2 are maintained at predetermined values. An example in which the output current Iout converges to a current between the reference currents Ir1 and Ir2 will be described with reference to FIG. 7.

As described above, when the output current Iout is lower than the reference current Ir1, the duty ratios of the step-up PWM signal and the step-down PWM signal increase, and the output current Iout increases. Furthermore, as described above, when the output current Iout is between the reference current Ir1 and the reference current Ir2 inclusive, the duty ratio of the step-up PWM signal continues to decrease, and the duty ratio of the step-down PWM signal continues to increase. During this period, the output current Iout comes close to the reference currents Ir1 and Ir2 alternately.

When the duty ratio of the step-up PWM signal reaches the lower limit value, and the duty ratio of the step-down PWM signal reaches an upper limit value, that is, when N reaches the lower limit value, and M reaches the upper limit value, the output current Iout is stabilized. The output current Iout is stabilized at a current between the reference currents Ir1 and Ir2.

Note that when the output current Iout is higher than the reference current Ir2, the step-up adjustment circuit 13 and the step-down adjustment circuit 14 respectively decrease the duty ratio of the step-up PWM signal and the duty ratio of the step-down PWM signal, and decrease the output current Iout. Also, when the output current Iout is between the reference current Ir1 and the reference current Ir2 inclusive, as described above, the output current Iout comes close to the reference currents Ir1 and Ir2 alternately, and is stabilized at the reference current Ir1, the reference current Ir2, or a current between the reference currents Ir1 and Ir2.

As described above, in the voltage converter 1, since the reference current Ir2 is higher than the reference current Ir1, the output current Iout is stabilized at a current between the reference current Ir1 and the reference current Ir2 inclusive.

Furthermore, as described above, the voltage Vd can be expressed as "K.times.r1.times.Iout", the reference voltage Vr1 can be expressed as "K.times.r1.times.Ir1", and the reference voltage Vr2 can be expressed as "K.times.r2.times.Ir2". The amplification ratio K and the resistance values r1 and r2 are constants. Therefore, if the reference current Ir2 is higher than the reference current Ir1, this means that the reference voltage Vr2 is higher than the reference voltage Vr1, and if the output current Iout is stable at a current between the reference current Ir1 and the reference current Ir2 inclusive, this means that the voltage Vd is stable at a voltage between the reference voltage Vr1 and the reference voltage Vr2 inclusive. Accordingly, it is also possible to state that, in the voltage converter 1, since the reference voltage Vr2 is higher than the reference voltage Vr1, the voltage Vd is stabilized at a voltage between the reference voltage Vr1 and the reference voltage Vr2 inclusive, and the output current Iout is stabilized at a current between the reference current Ir1 and the reference current Ir2 inclusive.

Figure 8:
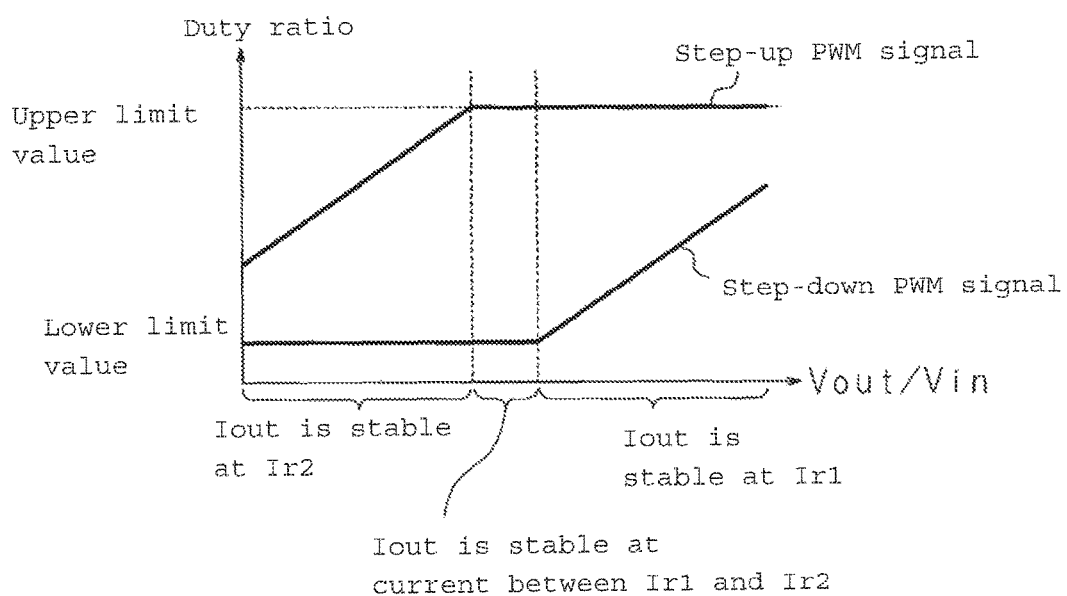
FIG. 8 is a graph illustrating a relationship between a ratio obtained by dividing an output voltage by an input voltage, and duty ratios of a step-up PWM signal and a step-down PWM signal.

FIG. 8 is a graph showing a relationship between the ratio Vout/Vin obtained by dividing the output voltage Vout by the input voltage Vin, and the duty ratios of the step-up PWM signal and the step-down PWM signal. FIG. 8 illustrates a graph showing a relationship between the duty ratio of the step-up PWM signal and the ratio Vout/Vin, and a graph showing a relationship between the duty ratio of the step-down PWM signal and the ratio Vout/Vin.

FIG. 8 shows the duty ratios of the step-up PWM signal and the step-down PWM signal when the output current Iout is stable. When the output current Iout is stable at the reference current Ir2, the duty ratio of the step-up PWM signal has a lower limit value, and the duty ratio of the step-down PWM signal has values that are smaller than an upper limit value. When the output current Iout is stable at the reference current Ir1, the duty ratio of the step-down PWM signal has the upper limit value, and the duty ratio of the step-up PWM signal exceeds the lower limit value. When the output current Iout is stable at a current between the reference currents Ir1 and Ir2, the duty ratio of the step-up PWM signal has the lower limit value, and the duty ratio of the step-down PWM signal has the upper limit value.

By changing the reference currents Ir1 and Ir2, it is possible to adjust the output current Iout after it has been stabilized. Since the reference current Ir1 can be expressed as "Vr1/(K.times.r1)" and the reference current Ir2 can be expressed as "Vr2/(K.times.r1)" as described above, it is possible to adjust the reference currents Ir1 and Ir2 by adjusting the reference voltages Vr1 and Vr2. Adjustment of the reference voltages Vr1 and Vr2 will be described below.

Figure 9:
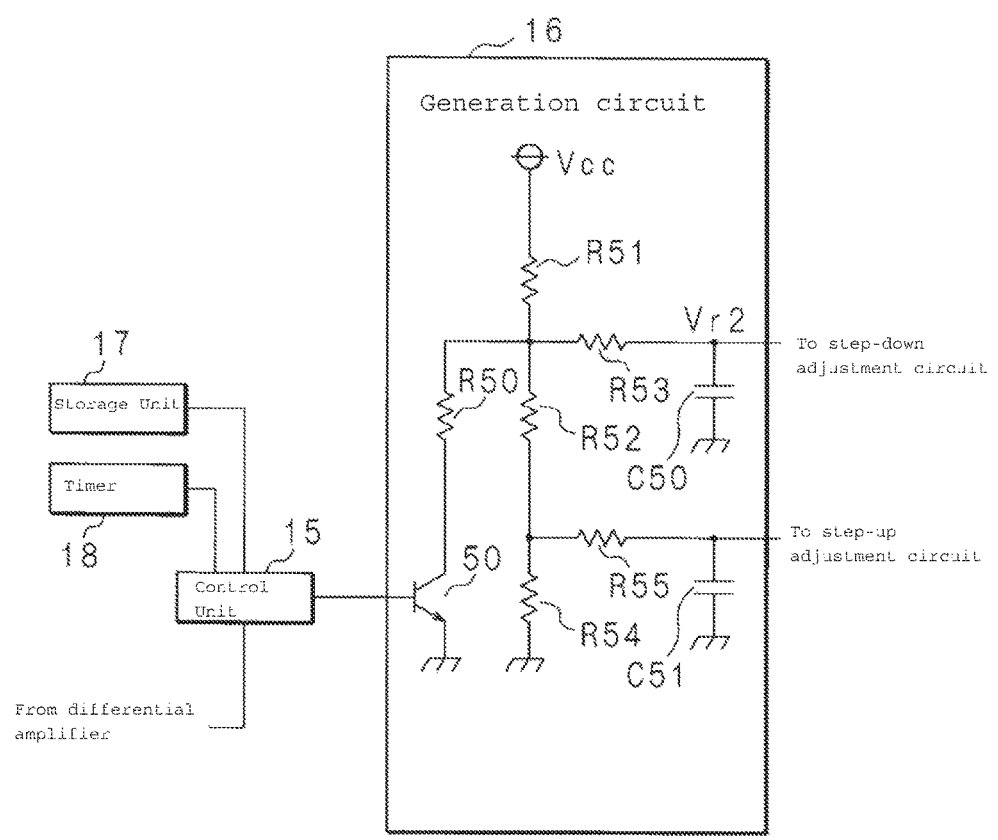
FIG. 9 is a circuit diagram of a generation circuit.

FIG. 9 is a circuit diagram of the generation circuit 16. The generation circuit 16 includes a transistor 50, capacitors C50 and C51, and resistors R50, R51, . . . , R55. The transistor 50 is an NPN-type bipolar transistor. The transistor 50 has a base that is connected to the control unit 15, a collector that is connected to one end of the resistor R50, and an emitter that is grounded. The other end of the resistor R50 is connected to one end of the resistor R51, one end of the resistor R52, and one end of the resistor R53. A predetermined voltage Vcc is applied to the other end of the resistor R51. The other end of the resistor R53 is connected to one end of the capacitor C50 and the step-down adjustment circuit 14, and the other end of the capacitor C50 is grounded.

The other end of the resistor R52 is connected to one end of the resistor R54 and one end of the resistor R55. The other end of the resistor R55 is connected to one end of the capacitor C51 and the step-up adjustment circuit 13. The other end of the capacitor C51 and the other end of the resistor R54 are grounded.

The transistor 50 functions as a switch. If the voltage that is applied to the base of the transistor 50 is a predetermined voltage or higher, taking the electrical potential at the emitter thereof as a reference, a current can flow between its collector and emitter, and the transistor 50 is turned on. If the voltage that is applied to the base of the transistor 50 is lower than the predetermined voltage, taking the electrical potential at the emitter thereof as a reference, no current flows between its collector and emitter, and the transistor 50 is turned off.

The control unit 15 outputs an adjustment PWM signal to the base of the transistor 50. When a high-level voltage is applied to the base of the transistor 50, the voltage of the base of the transistor 50 is the predetermined voltage or higher, taking the electrical potential at the emitter thereof as a reference, and the transistor 50 is turned on. When a low-level voltage is applied to the base of the transistor 50, the voltage of the base of the transistor 50 is lower than the predetermined voltage, taking the electrical potential at the emitter thereof as a reference, and the transistor 50 is turned off. As a result of the control unit 15 outputting an adjustment PWM signal to the base of the transistor 50, the transistor 50 is periodically turned on and off.

When the transistor 50 is in the OFF state, the resistor R51, and a series circuit of the resistors R52 and R53 divide the voltage Vcc, and a divided voltage Vs2 is applied between both ends of the capacitor C50 via the resistor R53. The resistors R52 and R54 divide the voltage Vs2, and a divided voltage Vs1 is applied between both ends of the capacitor C51 via the resistor R55. The voltage Vs2 is higher than the voltage Vs1 since the voltage Vs1 is generated by dividing the voltage Vs2.

When the transistor 50 is in the ON state, the resistor R51, and a parallel circuit in which the resistor R50 and the above-described series circuit are connected in parallel to each other divide the voltage Vcc, and a divided voltage Vt2 is applied between both ends of the capacitor C50 via the resistor R53. The resistors R52 and R54 divide the voltage Vt2, and a divided voltage Vt1 is applied between both ends of the capacitor C51 via the resistor R55. The voltage Vt2 is higher than the voltage Vt1 since the voltage Vt1 is generated by dividing the voltage Vt2.

The voltage Vs2 is higher than the voltage Vt2 since the resistance value of the above-described series circuit is larger than the resistance value of the above-described parallel circuit. Furthermore, the voltage Vs1 is higher than the voltage Vt1 since the voltages Vs1 and Vt1 are generated by the common resistors R52 and R54 dividing the voltages Vs2 and Vs1.

Since the control unit 15 outputs an adjustment PWM signal to the base of the transistor 50, the transistor 50 is periodically turned on and off. During a time period in which the transistor 50 is in the OFF state, the voltage Vs2 is applied between both ends of the capacitor C50, and during a time period in which the transistor 50 is in the ON state, the voltage Vt2 is applied between both ends of the capacitor C50. The capacitor C50 smoothes the voltage applied to both ends thereof. The voltage smoothed by the capacitor C50 serves as the reference voltage Vr2, and is output to the step-down adjustment circuit 14. The reference voltage Vr2 can be expressed as "Vs2.times.(1−Da)+Vt2.times.Da" with the duty ratio Da of the adjustment PWM signal.

Similarly, during a time period in which the transistor 50 is in the OFF state, the voltage Vs1 is applied between both ends of the capacitor C51, and during a time period in which the transistor 50 is in the ON state, the voltage Vt1 is applied between both ends of the capacitor C51. The capacitor C51 smoothes the voltage applied between both ends thereof. The voltage smoothed by the capacitor C51 serves as the reference voltage Vr1, and is output to the step-up adjustment circuit 13. The reference voltage Vr1 can be expressed as "Vs1.times.(1−Da)+Vt1.times.Da".

As described above, the generation circuit 16 generates the reference voltages Vr1 and Vr2, and outputs the generated reference voltages Vr1 and Vr2 to the step-up adjustment circuit 13 and the step-down adjustment circuit 14, respectively.

Furthermore, the resistors R52 and R54 divide the voltages Vs2 and Vt2 into predetermined fractions of voltage to generate the voltages Vs1 and Vt1. Therefore, the reference voltage Vr1 is a voltage that is a predetermined fraction of the reference voltage Vr2. Accordingly, it is possible to state that the generation circuit 16 generates the reference voltage Vr1 by dividing the reference voltage Vr2.

Since the reference voltage Vr1 is generated by dividing the reference voltage Vr2, when the reference voltage Vr2 is adjusted, the reference voltage Vr1 is also automatically adjusted.

If the duty ratio Da is zero, the reference voltages Vr1 and Vr2 are respectively equal to the voltages Vs1 and Vs2, and have the highest values. Furthermore, if the duty ratio Da is 1, the reference voltages Vr1 and Vr2 are respectively equal to the voltage Vs1 and Vs2, and have the lowest values. The control unit 15 adjusts the duty ratio Da to perform voltage adjustment processing for adjusting the reference voltage Vr1 and Vr2 that were generated by the generation circuit 16. The control unit 15 functions as adjusting means.

Figure 10:
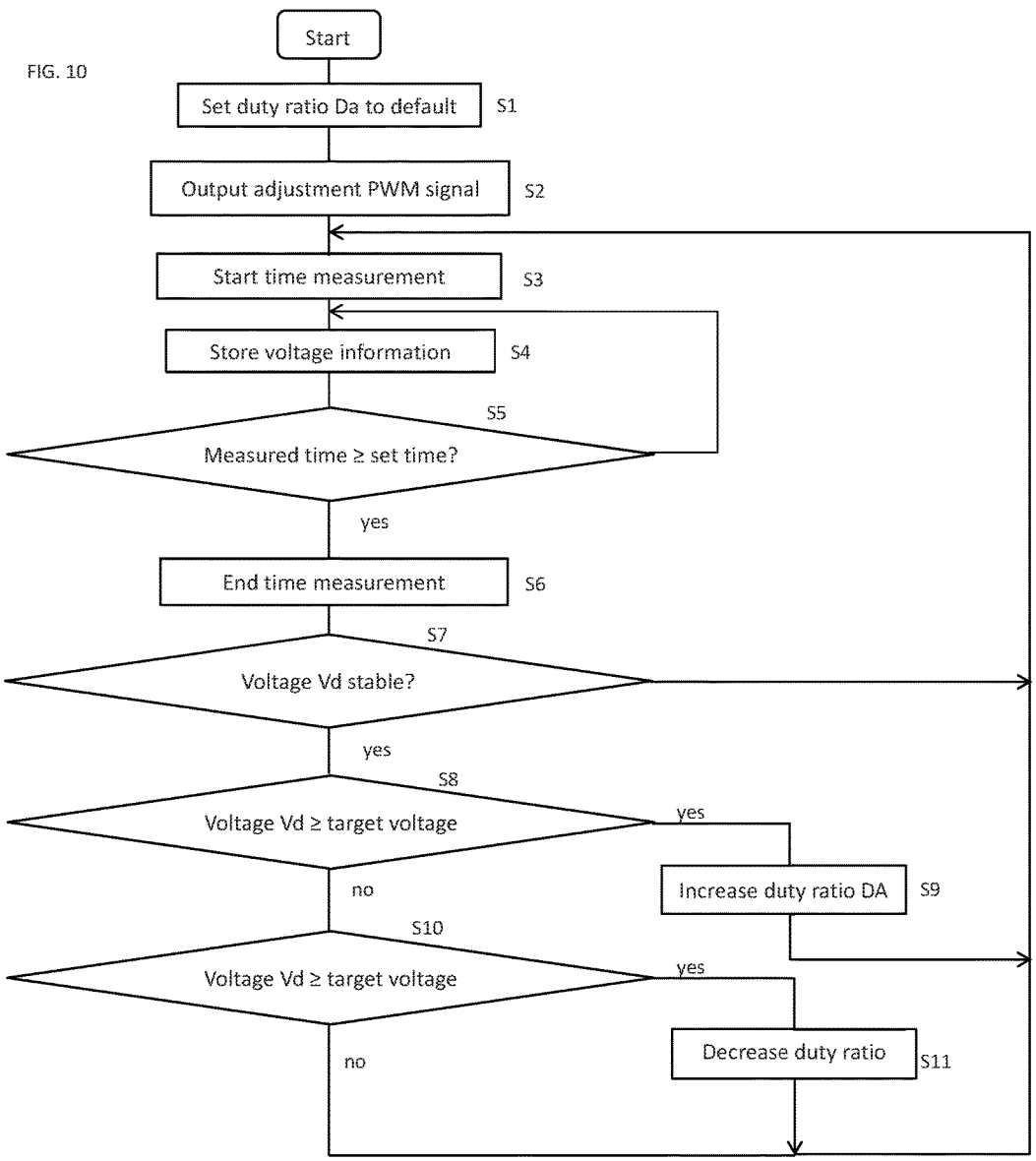
FIG. 10 is a flowchart illustrating a procedure of voltage adjustment processing that is executed by a control unit.

FIG. 10 is a flowchart illustrating the procedure of the voltage adjustment processing that is executed by the control unit 15. The control unit 15 starts the voltage adjustment processing when the voltage converter 1 is activated. First, the control unit 15 sets the duty ratio Da of the adjustment PWM signal to a default that is stored in advance in the storage unit 17 (step S1).

Then, the control unit 15 outputs an adjustment PWM signal whose duty ratio Da is the default (step S2). Accordingly, the reference voltages Vr1 and Vr2 that correspond to the duty ratio Da are respectively output to the step-up adjustment circuit 13 and the step-down adjustment circuit 14. The step-up adjustment circuit 13 and the step-down adjustment circuit 14 start adjusting the output current Iout.

Then, the control unit 15 outputs a start instruction to the timer 18 to cause the timer 18 to start time measurement (step S3), and causes the storage unit 17 to store voltage information indicating the voltage Vd input from the output terminal of the differential amplifier 12 (step S4). Then, the control unit 15 determines whether or not the measured time measured by the timer 18 is the set time or more (step S5).

If it is determined that the measured time is less than the set time (No in step S5), the control unit 15 returns the procedure to step S4 to cause the storage unit 17 to store the voltage information indicating the voltage Vd input from the output terminal of the differential amplifier 12. The control unit 15 repeatedly execute step S4 until the measured time is the set time or more. By the control unit 15 repeatedly executing step S4, voltage information indicating the voltage Vd input from the output terminal of the differential amplifier 12 is stored over time.

If it is determined that the measured time is the set time or more (Yes in step S5), the control unit 15 outputs an end instruction to the timer 18 to cause the timer 18 to end the time measurement (step S6). Then, the control unit 15 determines whether or not the voltage Vd output from the output terminal of the differential amplifier 12 is stable, based on the voltage Vd indicated by the plurality of pieces of voltage information that were stored in the storage unit 17 between a time when the timer 18 started the time measurement and a time when the measured time is the set time or more (step S7).

Here, the control unit 15 determines that the voltage Vd is stable if, for example, a difference voltage between the minimum value and the maximum value of the voltage Vd indicated by the above-described plurality of pieces of voltage information is a predetermined voltage or lower, and determines that the voltage Vd is not stable if the difference voltage exceeds the predetermined voltage. Since, as described above, the voltage Vd can be expressed as "K.times.r1.times.Iout", and the amplification ratio K and the resistance value r1 are constants, a stable voltage Vd means a stable output voltage Iout.

If it is determined that the voltage Vd, that is, the output current Iout is not stable (No in step S7), the control unit 15 returns the procedure to step S3. Accordingly, the control unit 15 again causes the storage unit 17 to store, over time, voltage information indicating the voltage Vd input from the output terminal of the differential amplifier 12, and determines whether or not the voltage Vd that was output from the output terminal of the differential amplifier 12 is stable, based on the voltage Vd indicated by the stored plurality of pieces of voltage information. The control unit 15 waits until the voltage Vd, that is, the output current Iout is stable.

If it is determined that the voltage Vd, that is, the output current Iout is stable (Yes in step S7), the control unit 15 determines whether or not the voltage Vd output from the output terminal of the differential amplifier 12 exceeds a target voltage stored in advance in the storage unit 17 (step S8). If it is determined that the voltage Vd exceeds the target voltage (Yes in step S8), the control unit 15 increases the duty ratio Da of the adjustment PWM signal that is to output to the base of the transistor 50 (step S9). Accordingly, the reference voltages Vr1 and Vr2 decrease, and the output current Iout varies again. By lowering the reference voltages Vr1 and Vr2, it is possible to decrease the voltage Vd that is stably output from the output terminal of the differential amplifier 12, and to decrease the output current Iout that flows stably between the output terminals B1 and B2 after the output current Iout has converged.

After the execution of step S9, the control unit 15 returns the procedure to step S3, and waits until the voltage Vd, that is, the output current Iout is stable. Then, when the voltage Vd is stabilized, the control unit 15 then executes step S8 again.

If it is determined that the voltage Vd does not exceed the target voltage (No in step S8), the control unit 15 determines whether or not the voltage Vd is lower than the target voltage (step S10). If it is determined that the voltage Vd is lower than the target voltage (Yes in step S10), the control unit 15 decreases the duty ratio Da of the adjustment PWM signal that is to output to the base of the transistor 50 (step S11). Accordingly, the reference voltages Vr1 and Vr2 increase, and the output current Iout varies again. By raising the reference voltages Vr1 and Vr2, it is possible to increase the voltage Vd that is stably output from the output terminal of the differential amplifier 12, and to increase the output current Iout that flows stably between the output terminals B1 and B2 after the output current Iout has converged.

After the execution of step S11, the control unit 15 returns the procedure to step S3, and waits until the voltage Vd, that is, the output current Iout is stable.

The control unit 15 returns the procedure to step S3, if it is determined that the voltage Vd is not lower than the target voltage, that is, the voltage Vd is the target voltage (No in step S10).

Even if the voltage Vd is the target voltage, and a desired output current Iout flows between the output terminals B1 and B2, there may be a case where, for example, due to a decrease in the output voltage of the battery 2, the input voltage Vin decreases, and the output current Iout decreases. As described above, the control unit 15 is repeating the procedure without ending it, and thus the control unit 15 adjusts again the reference voltages Vr1 and Vr2 so that the voltage Vd is equal to the target voltage.

As described above, in the voltage adjustment processing, the output current Iout that is stably flowing between the output terminals B1 and B2 is adjusted by adjusting the reference voltages Vr1 and Vr2.

Note that the configuration of the generation circuit 16 is not limited to a configuration in which the resistors R52 and R54 divide the reference voltage Vr2 to generate the reference voltage Vr1, and a configuration is also possible in which, for example, the reference voltages Vr1 and Vr2 are separately generated. Furthermore, the control unit 15 does not need to adjust the reference voltages Vr1 and Vr2 at the same time, and may adjust, for example, either one of the reference voltages Vr1 and Vr2.

Furthermore, the reference voltages Vr1 and Vr2 may be fixed values. In this case, the control unit 15 does not execute voltage adjustment processing, and predetermined reference voltages Vr1 and Vr2 are output to the step-up adjustment circuit 13 and the step-down adjustment circuit 14 from the generation circuit 16.

Furthermore, the configuration of the voltage converter 1 is not limited to a configuration in which the output current Iout is adjusted using the voltage Vd output from the output terminal of the differential amplifier 12, and a configuration is also possible in which, for example, a current flowing between the output terminals B1 and B2 is directly measured by an ammeter, and the output current Iout is adjusted using the measured current.

Furthermore, the voltage converter 1 may have a configuration in which a first switch is provided instead of the diode D1, and a second switch is provided instead of the diode D2. In this case, a step-down operation is executed by turning the FET 10 on and the first switch off, and turning the FET 10 off and the first switch on, that is, by turning the FET 10 and the first switch on and off in a complementary manner. Furthermore, a step-up operation is executed by turning the FET 11 on and the second switch off, and turning the FET 11 off and the second switch on that is, by turning the FET 11 and the second switch on and off in a complementary manner.

Furthermore, because the FETs 10 and 11 only need to function as switches, the FETs 10 and 11 are not limited to N channel-type FETs, and may be P channel-type FETs. Furthermore, bipolar transistors, relay contacts, or the like may be used, instead of the FETs 10 and 11. Because the transistor 50 as well only needs to function as a switch, the transistor 50 is not limited to a NPN-type bipolar transistor, and may be a PNP-type bipolar transistor. Furthermore, a FET, a relay contact, or the like may be used, instead of the transistor 50.

The present embodiment disclosed herein is to be construed as exemplary and not limiting in all respects. The scope of the present invention is defined by the claims rather than the description above, and is intended to encompass all modifications in the sense and the scope equivalent to the claims.

The invention claimed is:

1. A voltage converter that performs a step-up operation and a step-down operation in parallel, the step-up operation for raising an input voltage that is applied to a pair of input terminals to a voltage that is times the input voltage, wherein N is greater than or equal to one (1), and the step-down operation for lowering the input voltage to a voltage that is M times the input voltage, wherein M is less than or equal to one (1) and greater than or equal to zero (0), and that outputs the voltage that has been transformed through the step-up operation and the step-down operation from a pair of output terminals, the voltage converter comprising:
- a current detection circuit configured to detect a detected current flowing between the pair of output terminals;
- a step-up adjustment circuit configured to decrease N if the detected current is higher than a first current, and increase N if the detected current is lower than the first current; and
- a step-down adjustment circuit configured to decrease M if the detected current is higher than a second current, wherein the second current is greater than the first current, and increase M if the detected current is lower than the second current.

2. A voltage converter that performs, in parallel, a step-up operation for raising an input voltage that is applied to a pair of input terminals to a voltage that is N, wherein N is greater than or equal to one (1), times the input voltage, and a step-down operation for lowering the input voltage to a voltage that is M, wherein M is less than or equal to one (1) and greater than or equal to zero (0), times the input voltage, and that outputs the voltage that has been transformed through the step-up operation and the step-down operation from a pair of output terminals, the voltage converter comprising:
- output means for outputting a high voltage if a current flowing between the pair of output terminals is high, and outputting a low voltage if the current flowing between the pair of output terminals is low;
- a step-up adjustment circuit configured to decrease N if the voltage output by the output means is higher than a first voltage, and increase N if the voltage output by the output means is lower than the first voltage;
- and a step-down adjustment circuit configured to decrease M if the voltage output by the output means is higher than a second voltage, the second voltage being greater than the first voltage, and increase M if the voltage output by the output means is lower than the second voltage V2.

3. The voltage converter according to claim 2, further comprising:
- a generation circuit configured to generate the first voltage and the second voltage; and
- adjusting means for adjusting the first voltage or the second voltage.

4. The voltage converter according to claim 3, wherein the generation circuit is configured to generate the first voltage by dividing the second voltage.

* * * * *